(12) United States Patent
Kang et al.

(10) Patent No.: US 8,953,447 B2
(45) Date of Patent: Feb. 10, 2015

(54) METHOD AND APPARATUS FOR CONTROLLING TRAFFIC TRANSFER RATE BASED ON CELL CAPACITY IN MOBILE COMMUNICATION SYSTEM

(71) Applicant: Samsung Electronics Co. Ltd., Suwon-si, Gyeonggi-do (KR)

(72) Inventors: Seong-Ryong Kang, Seongnam-si (KR); Ki-Ho Cho, Seongnam-si (KR); Woo-Jae Kim, Suwon-si (KR); Ji-Cheol Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 13/755,688

(22) Filed: Jan. 31, 2013

(65) Prior Publication Data

US 2013/0201832 A1 Aug. 8, 2013

(30) Foreign Application Priority Data

Feb. 7, 2012 (KR) ........................ 10-2012-0012282

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 4/00* (2009.01)
*H04W 28/02* (2009.01)
*H04W 28/18* (2009.01)

(52) U.S. Cl.
CPC ...... *H04W 28/0231* (2013.01); *H04W 28/0236* (2013.01); *H04W 28/0257* (2013.01); *H04W 28/0284* (2013.01); *H04W 28/18* (2013.01)
USPC .......................................... 370/232; 370/328

(58) Field of Classification Search
None
See application file for complete search history.

(56) References Cited

U.S. PATENT DOCUMENTS

| 8,259,600 | B1* | 9/2012 | Dinan et al. | 370/252 |
| 2002/0068588 | A1* | 6/2002 | Yoshida et al. | 455/461 |
| 2005/0286422 | A1* | 12/2005 | Funato | 370/235 |
| 2006/0126507 | A1* | 6/2006 | Nakayasu | 370/229 |
| 2008/0068999 | A1* | 3/2008 | Ishii et al. | 370/235 |
| 2010/0177746 | A1* | 7/2010 | Gorokhov et al. | 370/336 |
| 2010/0189063 | A1* | 7/2010 | Kokku et al. | 370/329 |
| 2010/0271962 | A1* | 10/2010 | Han et al. | 370/252 |

* cited by examiner

*Primary Examiner* — Christopher Crutchfield
(74) *Attorney, Agent, or Firm* — Jefferson IP Law, LLP

(57) ABSTRACT

A system that provides a content delivery service to a user in a mobile communication system is provided. The system receives, from an enhanced Node B (eNB), cell-specific capacity information that is determined based on cell-specific load state information of the eNB, determines a transfer rate for traffic to be transmitted to a User Equipment (UE) in each cell, based on the received cell-specific capacity information, and transmits the traffic to be transmitted to the UE in each cell to the eNB at the determined transfer rate.

18 Claims, 3 Drawing Sheets

METHOD AND APPARATUS FOR CONTROLLING TRAFFIC TRANSFER RATE BASED ON CELL CAPACITY IN MOBILE COMMUNICATION SYSTEM

PRIORITY

This application claims the benefit under 35 U.S.C. §119 (a) of a Korean patent application filed in the Korean Intellectual Property Office on Feb. 7, 2012 and assigned Serial No. 10-2012-0012282, the entire disclosure of which is hereby incorporated by reference.

BACKGROUND OF THE INVENTION

1. Field of the Invention

The present invention relates to a method and an apparatus for controlling a traffic transfer rate based on cell capacity in a mobile communication system. More particularly, the present invention relates to a method and an apparatus for determining capacity of each cell of a base station using per cell load and for adaptively controlling a traffic transfer rate depending on a determined capacity of each cell in a mobile communication system.

2. Description of the Related Art

Due to the increasing use of smart devices, such as smart phones and tablet Personal Computers (PCs), the use of Internet content, such as web page access and video streaming, has increased exponentially in mobile communication networks. In order to efficiently handle the surging data traffic and to improve Quality of Service (QoS) and Quality of Experience (QoE), mobile operators, telecom equipment vendors and service solution vendors of the related art have incorporated functionalities of content caching and web and video traffic optimization in already deployed network equipment or installed network equipment that can provide those functionalities in the wireless networks, reducing delay and bandwidth consumption for content delivery.

The network equipment, solutions and systems aimed at providing the service enhancements in the mobile networks are collectively referred to as a service acceleration system. Commonly, the service acceleration system is placed between a core network of the wireless network and the external Internet to perform web content compression and/or bandwidth shaping or rate shaping for smooth or in-time video data transmission. The rate shaping in the service acceleration system provides the improved QoE to users and increases the operating efficiency of the operator networks.

The rate control or rate shaping of the related art is performed based on the network status estimation, which is similar to the method used for rate adjustment in wired networks. The network status estimation is performed in a way of estimating the available bandwidth and the network congestion based on the Round-Trip Time (RTT) of application packets, the spacing between TCP (Transmission Control Protocol) ACK (Acknowledgement) packets, and the receiver buffer level of user devices.

However, in the wireless link, for example, in the link between a User Equipment (UE) and a base station, the rate may often significantly vary between its minimum and maximum values depending on the channel status, such as user mobility, signal strength, interference between wireless signals, and the like. The number of active users that are connected to a base station may also be dynamically changed due to their mobility characteristics. Therefore, when used in the wireless network, the rate control or shaping mechanisms of the related art may cause various problems because it is hard to timely and accurately reflect the status of the wireless network.

The RTT of application packets, the spacing between ACK packets, or the receiver buffer level, which are used for the network status estimation of the related art, may not indicate the direct status of the wireless network, but may correspond to the indirect phenomenon which occurs some time after the network status was actually changed. Therefore, with the network status estimation of the related art, it is difficult to quickly and accurately detect the wireless network status depending on the mobility of users, the utilization of physical wireless resources, the signal interference, and the change in the number of active users. In addition, the rate control based on the inaccurate network status estimation may cause continuous over-provisioning and under-provisioning in rate and bandwidth control, thereby degrading the network operating efficiency.

Therefore, there exists a need for a method and an apparatus for controlling a traffic transfer rate based on the cell capacity in a mobile communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for controlling a traffic transfer rate based on the cell capacity in a mobile communication system.

Another aspect of the present invention is to provide a method and an apparatus that is capable of determining capacity of each cell by detecting per cell load of a base station, and adaptively controlling a traffic transfer rate depending on the determined capacity of each cell in a mobile communication system.

In accordance with one aspect of the present invention, a method for controlling a traffic transfer rate by a system that provides a content delivery service to a user in a mobile communication system is provided. The method includes receiving, from an eNB, cell-specific capacity information that is determined based on cell-specific load state information of the eNB, determining a transfer rate for traffic to be transmitted to a User Equipment (UE) in each cell, based on the received cell-specific capacity information, and transmitting the traffic to be transmitted to the UE in each cell to the eNB at the determined transfer rate.

In accordance with another aspect of the present invention, a method for transmitting information for controlling a traffic transfer rate by an eNB in a mobile communication system is provided. The method includes determining a load state of each cell of the eNB, detecting a capacity of each cell based on information about the determined load state of each cell of the eNB, and transmitting information about the detected capacity of each cell to a service acceleration system that controls the traffic transfer rate.

In accordance with further another aspect of the present invention, a system that provides a content delivery service to a user in a mobile communication system is provided. The system includes a receiver for receiving, from an eNB, cell-specific capacity information that is determined based on cell-specific load state information of the eNB, a controller for determining a transfer rate for traffic to be transmitted to a UE in each cell, based on the received cell-specific capacity information, and a transmitter for transmitting the traffic to be transmitted to the UE in each cell to the eNB at the determined transfer rate.

In accordance with still another aspect of the present invention, an eNB in a mobile communication system is provided. The eNB includes a controller for determining a load state of each cell of the eNB, and for detecting a capacity of each cell based on information about the determined load state of each cell of the eNB, and a transmitter for transmitting information about the detected capacity of each cell to a service acceleration system that controls a traffic transfer rate.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
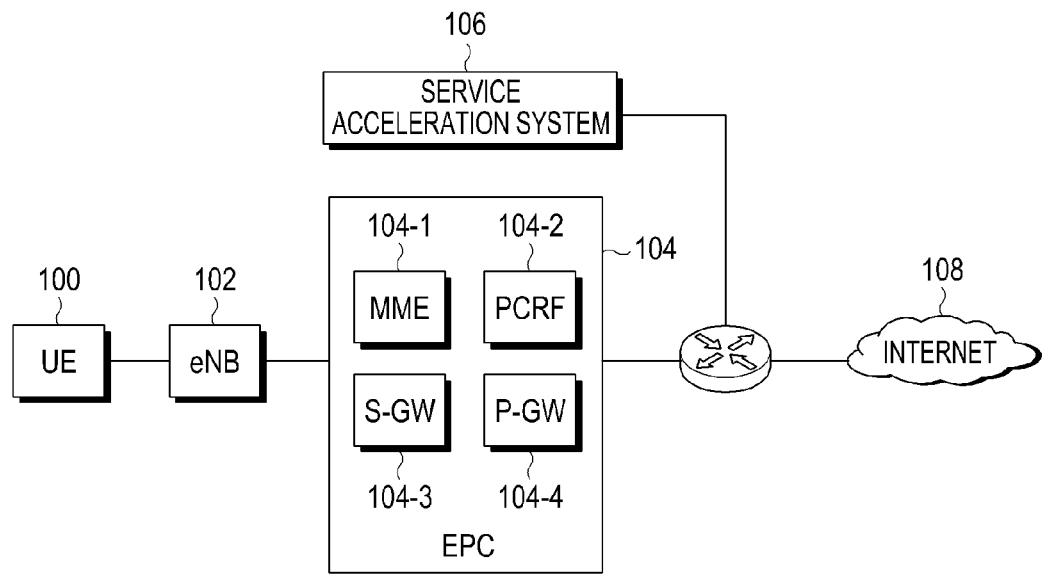
FIG. 1 illustrates a configuration of a mobile communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for controlling a traffic transfer rate in a mobile communication system. More specifically, exemplary embodiments of the present invention provide a method and an apparatus for determining a load state of each cell based on wireless resource usage information, backhaul bandwidth usage information and active user count information of a base station, detecting capacity of each cell of the base station based on the load state information of each cell (hereinafter referred to as 'cell-specific load state information' for short), and controlling a transfer rate for traffic to be transmitted to a User Equipment (UE) in each cell depending on the detected capacity of each cell in a mobile communication system.

FIGS. 1 through 7, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Now, reference will be made to FIG. 1, which shows a configuration of a mobile communication system according to an exemplary embodiment of the present invention.

FIG. 1 illustrates a configuration of a mobile communication system according to an exemplary embodiment of the present invention.

Referring to FIG. 1, the mobile communication system includes a UE 100, a Long Term Evolution (LTE) network including an eNB 102 that is an access node of UEs and an Evolved Packet Core (EPC) 104, the Internet 108, and a service acceleration system 106 for improving Quality of Experience (QoE) of service users.

The UE 100 accesses the LTE network via the eNB 102, and the eNB 102 and the EPC 104 perform the basic operations which are performed in the common LTE network. The UE 100 sends a content request message to the eNB 102, and the eNB 102 forwards the content request message to the EPC 104. The content requested by a user is delivered from the EPC 104 to the UE 100 via the eNB 102.

In an exemplary embodiment of the present invention, the eNB 102 performs the following operations so that traffic control operations may be performed in the service acceleration system 106. The eNB 102 detects a load state of each cell based on at least one of wireless resource usage information (for example, usage information about Physical Resource Blocks (PRBs)), backhaul bandwidth usage information and active user count (or the number of active users) information, and determines capacity of each cell of the eNB 102 based on the cell-specific load state information. The eNB 102 delivers information about the determined capacity to the service acceleration system 106 via a management system (not shown) of the LTE network, or using a header of a content request message from a user.

The EPC 104 includes a Mobility Management Entity (MME) 104-1, a Policy and Charging Rules Function (PCRF) 104-2, a Serving Gateway (S-GW) 104-3, and a Packet Data Network Gateway (P-GW) 104-4. The basic operations of the EPC 104 are the same as those of the common EPC, so a description thereof will be omitted for brevity. An EPC operation of an exemplary embodiment of the present invention that is different from that of the related art is to handle user requests through the use of the service acceleration system 106.

More specifically, upon receiving a user's content request message from the eNB 102, the EPC 104 forwards the received content request message to the service acceleration system 106. If the service acceleration system 106 has valid content, which corresponds to the requested content and is cached therein, the service acceleration system 106 directly delivers the content to the eNB 102 via the EPC 104. In contrast, if the service acceleration system 106 has no valid content, which corresponds to the requested content and is cached therein, the service acceleration system 106 forwards the content request message to a server on the Internet to retrieve the requested content. When the requested content is received from the server, the service acceleration system 106 caches the received content, and then forwards it to the user through the EPC 104 and the eNB 102 of the LTE network.

In an exemplary embodiment of the present invention, the service acceleration system 106 receives information about capacity of each cell (hereinafter referred to as 'cell-specific capacity information' for short), which is obtained by the eNB 102, and determines a control parameter value based on the received cell-specific capacity information. The service acceleration system 106 determines a traffic transfer rate using the determined control parameter value and utilizes the determined traffic transfer rate to transmit packets carrying the requested content to the LTE network.

Although it is assumed in FIG. 1 that the service acceleration system 106 is placed between the EPC 104 and the Internet 108 by way of example, the service acceleration system 106 may be placed between the eNB 102 and the EPC 104, or may be included in the P-GW 104-4 in the LTE network in alternative exemplary embodiments of the present invention. If the service acceleration system 106 is placed between the eNB 102 and the EPC 104, a user's content request message is delivered to the service acceleration system 106 after being filtered by the eNB 102.

Figure 2:
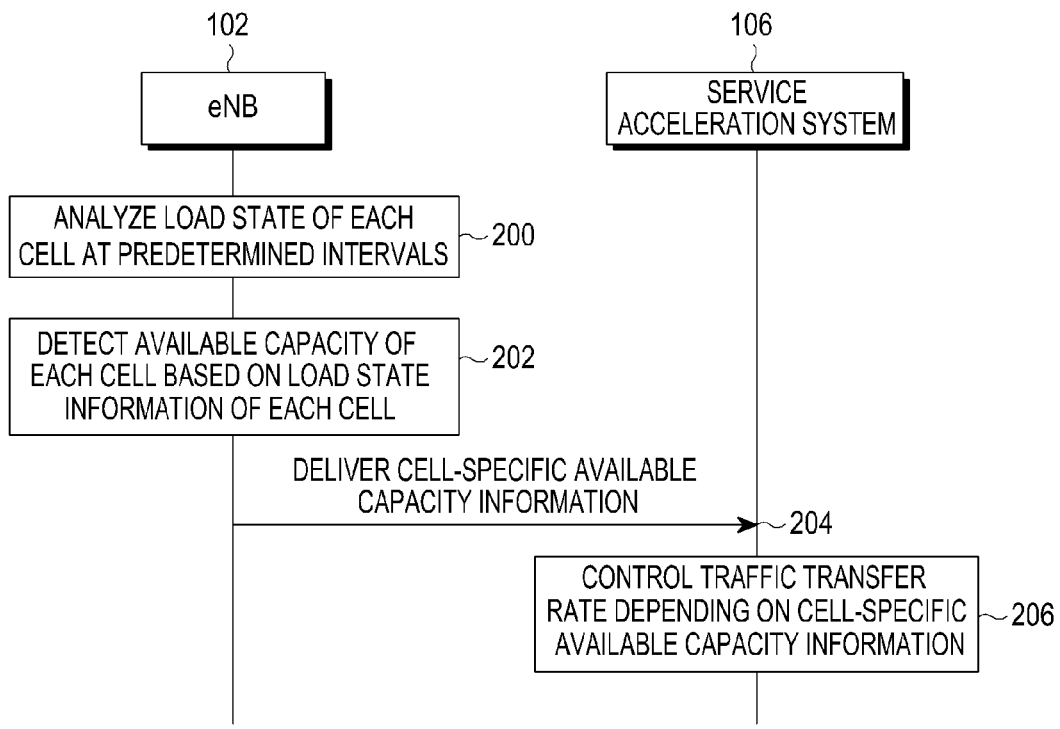
FIG. 2 is a signal flow diagram illustrating a process of controlling a traffic transfer rate in a mobile communication system according to an exemplary embodiment of the present invention.

Reference will now be made to FIG. 2, which shows a process of controlling a traffic transfer rate by means of the service acceleration system 106.

FIG. 2 is a signal flow diagram illustrating a process of controlling a traffic transfer rate in a mobile communication system according to an exemplary embodiment of the present invention.

In the mobile communication system configured as in FIG. 1, a traffic transfer rate may be controlled by communication between the eNB 102 and the service acceleration system 106. The communication between the eNB 102 and the service acceleration system 106 may be performed in a variety of ways including a direct communication between them and communication through the use of the EPC 104 or an LTE management system (not shown in FIG. 1).

Referring to FIG. 2, in step 200, the eNB 102 analyzes a load state of its each cell at predefined intervals. More specifically, the eNB 102 analyzes the load state of each cell using at least one of three types of information which directly and substantially affects the load of the wireless network, for example, PRB usage information, backhaul bandwidth usage information, and active user count information for each cell.

The PRB usage information indicates usage of wireless resources of each cell, and the backhaul bandwidth usage information indicates a traffic load of each cell. The active user count information is information that is used to detect more accurate cell-specific load since a signaling load of the system varies depending on the number of users.

After analyzing the load state of each cell, the eNB 102 determines a cell-specific available capacity based on the cell-specific load state information in step 202. More specifically, the cell-specific available capacity may be detected in the following ways.

First, the eNB 102 determines an available PRB ratio and an available BackHaul BandWidth (BH BW) ratio, which are two parameters used to determine the cell-specific available capacity. The available PRB ratio indicates a ratio of PRB allocable to new users to the total PRB, and the available BH BW ratio indicates a ratio of BH BW allocable to new users to the total BH BW.

When determining the available PRB ratio and the available BH BW ratio, the eNB 102 considers the PRB usage and BH BW usage per user in each cell. As to a relationship between the average number of users and wireless resource utilization of each eNB, the wireless resource utilization is generally high as the number of users is large, but in some cases, the resource utilization may be very high despite the number of users is very small. This implies that utilizations of the PRB and the BH BW do not always have a linear relationship with the number of users. Thus, in an exemplary embodiment of the present invention, the eNB 102 considers PRB usage per user and BH BW usage per user in each cell, when determining the available PRB ratio and the available BH BW ratio.

In an exemplary embodiment of the present invention, the eNB 102 calculates the available PRB ratio, using the number of currently unused PRBs and the number of PRBs for Non-Guaranteed Bit Rate (GBR) traffic that are allocable to other users. P is defined as the total number of PRBs, $P_{GBR}$ is defined as the number of PRBs used for GBR traffic, $P_{NGBR}$ is defined as the number of PRBs used for Non-GBR traffic, and $P_{AV}$ is defined as the number of currently unused remaining PRBs. Then, the total number of PRBs is represented by Equation (1) below.

$$P = P_{GBR} + P_{NGBR} + P_{AV} \quad (1)$$

Next, if the number of active users in the cell is denoted by N and all users each have at least one default bearer (i.e., a Non-GBR), the available PRB ratio, X, may be computed by Equation (2) below.

$$X = \frac{1}{P}\max[P_{AV}, (P_{AV} + P_{NGBR})/(N+1)] \quad (2)$$

As shown in Equation (2), the available PRB ratio is normalized with the number of active users. Therefore, even though the same number of PRBs are used, the available PRB ratio decreases as the number of users grows.

In an exemplary embodiment of the present invention, the eNB 102 calculates the available BH BW ratio based on the currently unused BH BW and the BH BW used by Non-GBR traffic, which are allocable to other users. If the total BH BW is denoted by B, the BH BW used for GBR traffic is denoted by $B_{GBR}$, the BH BW used for Non-GBR traffic is denoted by $B_{NGBR}$, and the currently unused remaining BH BW is denoted by $B_{AV}$, then the total BH BW is represented by Equation (3) below.

$$B = B_{GBR} + B_{NGBR} + B_{AV} \quad (3)$$

Y is defined as the available BH BW ratio. Then, Y may be obtained using the following Equation (4):

$$Y = \frac{1}{B}\max[B_{AV}, (B_{AV} + B_{NGBR})/(N+1)] \quad (4)$$

Similar to the available PRB ratio calculated in Equation (2), the available BH BW is also normalized with the number of active users. Therefore, even though the same amount of BH BW is used, the available BH BW ratio decreases as the number of users increases.

In an alternative exemplary embodiment of the present invention, the eNB 102 may determine the available BH BW ratio without separately identifying BH BW usage for the GBR traffic and the Non-GBR traffic, as described above. In this case, the eNB 102 determines the available BH BW ratio, Y, using Equation (5) below.

$$Y = \max[0, (B - \alpha \times MBR)/B] \quad (5)$$

In Equation (5), MBR denotes the maximum rate of aggregated GBR traffic, and α denotes a constant value which is greater than 0 and less than or equal to 1 (i.e., 0<α≤1). The constant α is set to be less than 1, if the aggregated GBR traffic does not actually use MBR of 100%. In an alternative exemplary embodiment of the present invention, the actually measured rate of the aggregated GBR traffic may be used instead of the MBR.

After determining the available PRB ratio and the available BH BW ratio in this way, the eNB 102 detects a cell-specific available capacity value using at least one of the determined available PRB ratio and available BH BW ratio. More specifically, if the determined available PRB ratio and available BH BW ratio are denoted by X and Y, respectively, and the available capacity of a specific cell is denoted by c (0≤c≤1), the eNB 102 detects the available capacity, c, using a specific function of X and Y. For example, an available capacity of each cell may be determined using "c=min(X,Y)", since it may be limited by a smaller one of the available PRB ratio and the available BH BW ratio. In addition, the available capacity of each cell may be determined using only any one of the available PRB ratio and the available BH BW ratio (c=X or c=Y), and may also be determined using a variety of ways, such as an arbitrary combination of X and Y.

After determining the available capacity of each cell, the eNB 102 delivers the cell-specific available capacity information to the service acceleration system 106 via a management system (for example, an LTE System Manager (LSM) in the case of the LTE network) of the mobile communication network, or using a method described below, in step 204. Thereafter, the service acceleration system 106 controls the traffic transfer rate based on the cell-specific available capacity information in step 206.

Figure 3:
FIG. 3 illustrates maximum and minimum rates of traffic, a difference value between the maximum and minimum rates, and a ratio of the difference value according to an exemplary embodiment of the present invention.

Reference will now be made to FIG. 3 to describe a technique for controlling, by the service acceleration system 106, a transfer rate of traffic using cell-specific capacity information of the eNB 102.

FIG. 3 illustrates maximum and minimum rates of traffic, a difference value between the maximum and minimum rates, and a ratio of the difference value according to an exemplary embodiment of the present invention.

Referring to FIG. 3, the service acceleration system 106 transmits traffic at the predefined maximum rate $R_{max}$ if the cell capacity is high (i.e., if the cell load is low). As the cell capacity decreases (i.e., as the cell load increases), the service acceleration system 106 maintains the traffic transfer rate at a value that is determined by adding a specific fraction, qD, of a difference value D between $R_{max}$ and $R_{min}$ to the predefined minimum rate $R_{min}$. The traffic transfer rate determined by the service acceleration system 106 is shown by Equation (6) below.

$$R = R_{min} + qD = (1-q)R_{min} + qR_{max} \quad (6)$$

In Equation (6), q denotes a control parameter that has a value greater than or equal to 0 and less than or equal to 1 (0≤q≤1), and is used to determine a value by which a transfer rate is higher than $R_{min}$. It is preferable that the control parameter q is controlled depending on the change in the cell capacity c, as follows:

The control parameter q is increased, if the cell capacity c is increased.

The control parameter q is decreased, if the cell capacity c is decreased.

The traffic transfer rate control performance of the service acceleration system 106 is determined by the control parameter (i.e., a value of q) that is selected depending on the cell capacity (cell load) level. Accordingly, the service acceleration system 106 adaptively determines a value of q depending on the change in the cell capacity value using Equation (7) below.

$$q_j(n) = q_j(n-1) + \tau[c_j(n-1)/c_{thr} - q_j(n-1)] \quad (7)$$

In Equation (7), j denotes a cell number (or a cell index) of an eNB, $q_j(n)$ denotes a control parameter of a j-th cell, which is measured in an n-th control step, c(n−1) denotes an available capacity value of a j-th cell, which is measured in an (n−1)-th control step, τ denotes a gain parameter of the system that controls the control parameter, and $c_{thr}$ denotes a constant having a value that is greater than 0 and less than or equal to 1 (0<$c_{thr}$≤1). The constant $c_{thr}$ is a value used to determine a weight of a cell capacity, which will be actually reflected in calculation of a value of q.

As shown in Equation (7), a value of q in an n-th control step is determined by applying a difference value between a certain ratio of the cell capacity value and a value of q in an (n−1)-th control step to the value calculated in the previous (n−1)-th control step. Equation (7) may be stably operated in the case that the gain parameter τ meets the necessary and sufficient conditions shown in Equation (8) below.

$$0 < \tau < 2 \quad (8)$$

If the control parameter value $q_j(n)$ is determined as described above, the service acceleration system 106 determines a traffic transfer rate using Equation (9) below.

$$R_j(n)=R_{min}+\min(1,q_j(n))(R_{max}-R_{min}) \quad (9)$$

In Equation (9), $R_j(n)$ denotes an n-th traffic transfer rate of a j-th cell and "min(1, $q_j(n)$)" is used since $q_j(n)$ cannot be greater than 1.

Figure 4:
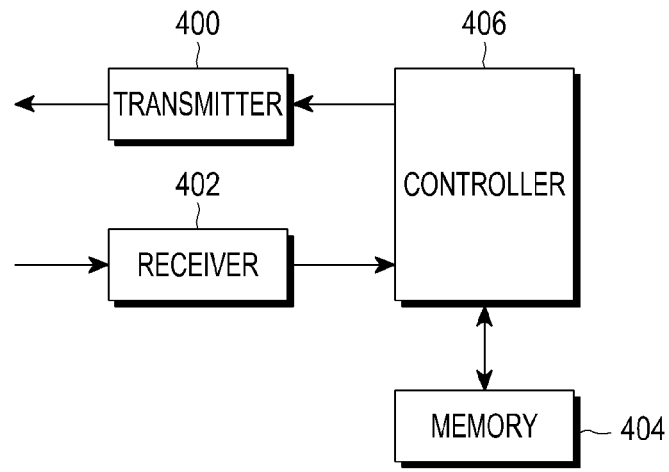
FIG. 4 illustrates a structure of an enhanced Node B (eNB) according to an exemplary embodiment of the present invention.

Reference will now be made to FIG. 4, which shows an internal structure of an eNB according to an exemplary embodiment of the present invention.

FIG. 4 illustrates a structure of an eNB according to an exemplary embodiment of the present invention.

Referring to FIG. 4, the eNB includes a transmitter 400, a receiver 402, a memory 404, and a controller 406.

The transmitter 400 and the receiver 402 are components for communicating with a UE, an LTE network and/or a service acceleration system. Upon receiving a content request from the UE 100 at the receiver 402, the transmitter 400 sends the content request message to the LTE network. Upon receiving traffic for the requested content from the LTE network at the receiver 402, the transmitter 400 transmits the received traffic to the UE.

The memory 404 stores a variety of information that is generated during an operation of the eNB. The controller 406 controls the overall operation of the eNB by controlling the transmitter 400, the receiver 402, and the memory 404.

In an exemplary embodiment of the present invention, the controller 406 analyzes a load state of each cell using at least one of PRB usage information, backhaul bandwidth usage information, and active user count information for each cell. The controller 406 detects a cell-specific available capacity based on the analyzed cell-specific load state information. The process of analyzing a load state of each cell and detecting a cell-specific available capacity has already been described above, so its description will be omitted.

The controller 406 delivers the detected cell-specific available capacity to the service acceleration system by controlling the transmitter 400, using the following method. The controller 406 delivers the detected cell-specific available capacity to the service acceleration system periodically or aperiodically when necessary through the management system of the mobile communication network. Alternatively, the controller 406 may deliver the cell-specific capacity to the service acceleration system using direct communication.

In an another exemplary embodiment of the present invention, the controller 406 delivers the detected cell-specific available capacity to the service acceleration system using a reserved field of a protocol header (for example, a Transmission Control Protocol (TCP) or Internet Protocol (IP) header) of user traffic. In this case, depending on the limited number of bits of the reserved field of the protocol header, the controller 406 delivers the detected cell-specific available capacity to the service acceleration system using one bit or m bits.

More specifically, when using one bit to deliver the detected cell-specific available capacity, the controller 406 delivers the detected cell-specific available capacity to the service acceleration system in the form of ON or OFF (i.e., 1 or 0). In other words, if the detected cell-specific available capacity is greater than or equal to a predefined threshold, the controller 406 delivers "ON (or 1)" information to the service acceleration system by including it in the reserved field. Since the "ON (or 1)" information indicates a low-cell load state, the traffic transfer rate is set to its maximum value according to the above-described Equations (7) and (13) (i.e., $R_j(n)=R_{max}$ (for $\tau=1$, $c_{thr}=1$)).

If the detected cell-specific available capacity is less than a predefined threshold, the controller 406 delivers "OFF (or 0)" information to the service acceleration system by inserting it in the reserved field. Since the "OFF (or 0)" information indicates a high-cell load state, the traffic transfer rate is set to its minimum value according to the above-described Equations (7) and (13) (i.e., $R_j(n)=R_{min}$, (for $\tau=1$)).

When using m bits to deliver the detected cell-specific available capacity, the controller 406 delivers information about a level corresponding to the detected cell-specific available capacity among $2^m$ available capacity levels to the service acceleration system by including the information in the served field. For example, if m is 2, the controller 406 selects one level corresponding to the detected cell-specific available capacity from among four available capacity levels, using Table 1 below, and determines available capacity information corresponding to the selected level. The controller 406 delivers the determined available capacity information to the service acceleration system by including it in the reserved field.

TABLE 1

| Detected Available Capacity | Available Capacity Level | Available Capacity Info to be Transmitted |
|---|---|---|
| $0 <= c < 0.25$ | 0 | 00 |
| $0.25 <= c < 0.5$ | 1 | 01 |
| $0.5 <= c < 0.75$ | 2 | 10 |
| $0.75 <= c <= 1$ | 3 | 11 |

In this way, if the detected cell-specific capacity is reported as k, which is one of $2^m$ available capacity levels, a control parameter value $q_j(n)$ is determined as $c_j(n-1)=(k+1)/2^m$ and is used in Equation (7), and a traffic transfer rate $R_j(n)$ is determined as the determined $q_j(n)$ and is used in Equation (13).

The mapping, shown in Table 1, between the actually detected available capacity value and the capacity level to be delivered to the service acceleration system is an example, and another way of mapping may be used in an alternative exemplary embodiment of the present invention. The method of converting the capacity level delivered as k into an actual capacity value c has also been described as an example, and in an alternative exemplary embodiment of the present invention, the capacity level delivered in a variety of ways may be converted into an actual capacity value.

Next, an internal structure of a service acceleration system according to an exemplary embodiment of the present invention will be described with reference to FIG. 5.

Figure 5:
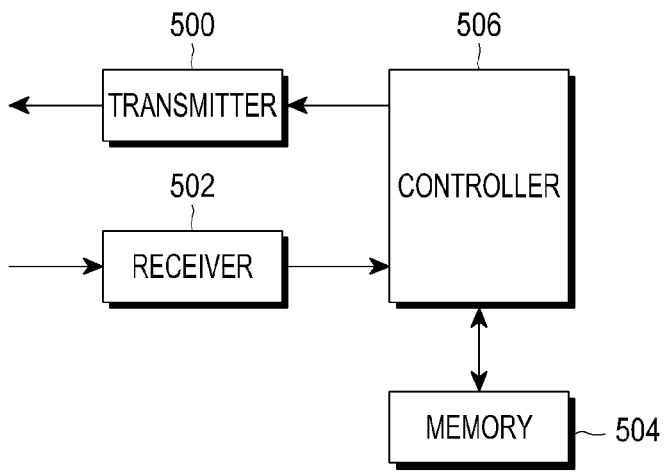
FIG. 5 illustrates a structure of a service acceleration system according to an exemplary embodiment of the present invention.

FIG. 5 illustrates a structure of a service acceleration system according to an exemplary embodiment of the present invention.

Referring to FIG. 5, the service acceleration system includes a transmitter 500, a receiver 502, a memory 504, and a controller 506.

The transmitter 500 and the receiver 502 are components for communicating with the LTE network or the eNB, and the Internet. Upon receiving at the receiver 502 a message for requesting to deliver the requested content from the LTE network, the transmitter 500 transmits cached content to the LTE network. If the requested content is not present in the cache or is invalid, the transmitter 500 forwards the received message to the Internet. Upon receiving traffic for the requested content from the Internet at the receiver 502, the transmitter 500 caches the received content and transmits it to the LTE network.

The memory 504 stores a variety of information that is generated during an operation of the service acceleration system. The controller 506 controls the overall operation of the service acceleration system by controlling the transmitter 500, the receiver 502, and the memory 504.

In an exemplary embodiment of the present invention, the controller 506 receives cell-specific capacity information detected by the eNB, through the receiver 502. The controller 506 determines a control parameter value $q_j(n)$ using the received cell-specific capacity information, and determines a traffic transfer rate $R_j(n)$ using the determined control parameter value. Subsequently, the controller 506 controls the rate at which it transmits the content requested by the user to the LTE network, depending on the determined traffic transfer rate.

In an exemplary embodiment of the present invention, the controller 506 controls all the users belonging to the same cell with the same traffic transfer rate without discrimination. However, in an alternative exemplary embodiment of the present invention, the controller 506 may limit the traffic transfer rate for a specific user (for example, a heavy user that uses traffic, the amount of which is greater than or equal to a predefined threshold) to a level which is higher than that of the normal user that uses traffic, the amount of which is less than a threshold, based on the users' subscriber information, the operator policies, and the subscribers' data usage patterns.

For example, for a heavy user, if the cell capacity is reduced to a certain level (for example, 25%) or below, the controller 506 sets the control parameter value to 0 ($q_j(n)=0$) so that the traffic transfer rate may have its minimum value $R_{min}$. If the cell load is high, the controller 506 reduces the traffic transfer rate of the heavy user as much as possible so that service of the other users may not be limited.

Figure 6:
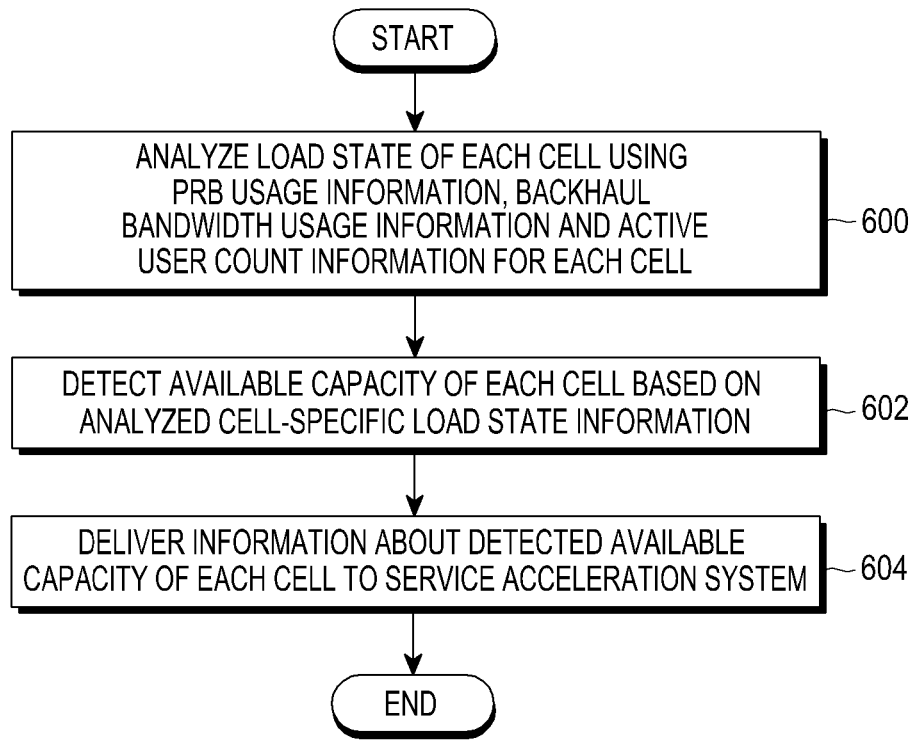
FIG. 6 is a flowchart illustrating a process of detecting a cell capacity in an eNB according to an exemplary embodiment of the present invention.

Reference will now be made to FIG. 6, which shows a process of detecting a cell capacity in an eNB according to an exemplary embodiment of the present invention.

FIG. 6 is a flowchart illustrating a process of detecting a cell capacity in an eNB according to an exemplary embodiment of the present invention.

Referring to FIG. 6, the eNB analyzes a load state of each cell using at least one of PRB usage information, backhaul bandwidth usage information, and active user count information for each cell, in step 600. The eNB detects a cell-specific available capacity based on the analyzed cell-specific load state information in step 602, and delivers information about the detected cell-specific available capacity to the service acceleration system in step 604.

Figure 7:
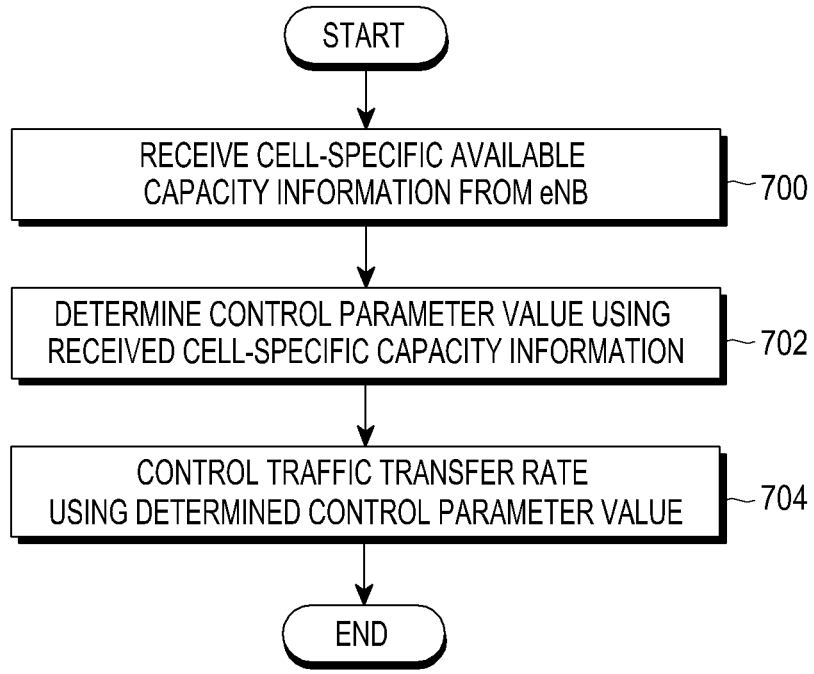
FIG. 7 is a flowchart illustrating an operation of a service acceleration system according to an exemplary embodiment of the present invention.

FIG. 7 is a flowchart illustrating an operation of a service acceleration system according to an exemplary embodiment of the present invention.

Referring to FIG. 7, the service acceleration system receives information about a cell-specific available capacity detected by an eNB in step 700. The service acceleration system determines a control parameter value using the received cell-specific capacity information in step 702. Subsequently, the service acceleration system controls a transfer rate for the traffic transmitted to a UE in each cell using the determined control parameter value, in step 704.

As is apparent from the foregoing description, exemplary embodiments of the present invention may rapidly and accurately detect the actual load and cell capacity of an eNB using the factors that substantially and directly indicate a load of the wireless network in the mobile communication system.

In addition, exemplary embodiments of the present invention may dynamically and adaptively control a traffic transfer rate depending on the substantial capacity of the eNB's cell.

Moreover, exemplary embodiments of the present invention may prevent a small number of heavy users from unfairly occupying the wireless resources and bandwidth, thereby making it possible to prevent eNB congestion and increase fairness between users in the cell.

Exemplary embodiments of the present invention may effectively control a traffic transfer rate for a long flow that requires a relatively long session, similar to the file download, thereby making it possible to prevent degradation in the quality of delay-sensitive services, such as a web page download.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a traffic transfer rate by a system that provides a content delivery service to a user in a mobile communication system, the method comprising:
  receiving, from an enhanced Node B (eNB), cell-specific capacity information that is determined based on cell-specific load state information of the eNB;
  detecting a load level of each cell using the received cell-specific capacity information;
  determining a cell-specific control parameter value corresponding to the detected load level of each cell; and
  determining a transfer rate for traffic to be transmitted to a user equipment (UE) in each cell, using the determined cell-specific control parameter value,
  wherein the determining of the cell-specific control parameter value comprises, if the detected load level of each cell is greater than or equal to a threshold, increasing a previously determined cell-specific control parameter value and determining the increased cell-specific control parameter value as a cell-specific control parameter value corresponding to the detected load level of each cell.

2. The method of claim 1, wherein the cell-specific load state information is determined based on at least one of wireless resource usage information, backhaul bandwidth usage information, and active user count information for each cell; and
  wherein the cell-specific capacity information is determined using at least one of an available physical resource block (PRB) ratio and an available backhaul bandwidth ratio, which are determined based on the cell-specific load state information.

3. The method of claim 1, wherein the cell-specific capacity information is received from the eNB periodically or aperiodically, and includes at least one of a cell-specific available capacity value, available capacity level information corresponding to the cell-specific available capacity value, and a bit value corresponding to the available capacity level information.

4. The method of claim 1, wherein the determining of the cell-specific control parameter value comprises:
  if the detected load level of each cell is less than the threshold, decreasing the previously determined cell-specific control parameter value and determining the decreased cell-specific control parameter value as a cell-specific control parameter value corresponding to the detected load level of each cell.

5. The method of claim 1, wherein the determining of the transfer rate comprises:
  calculating a first value indicating a difference between a maximum value and a minimum value of a predefined traffic transfer rate;

calculating a second value by multiplying the calculated first value by the determined cell-specific control parameter value;

calculating a third value by adding the calculated second value to the minimum value; and determining the calculated third value as the transfer rate for the traffic to be transmitted to the UE in each cell.

6. A method for transmitting information for controlling a traffic transfer rate by an enhanced Node B (eNB) in a mobile communication system, comprising:

determining a cell-specific load state information of each cell of the eNB;

detecting a cell-specific capacity information of each cell based on the determined cell-specific load state information of each cell of the eNB; and transmitting the detected cell-specific capacity information of each cell to a service acceleration system that controls the traffic transfer rate wherein the traffic transfer rate is determined by using a cell-specific control parameter value corresponding to a load level of each cell that is detected based on the cell-specific capacity information, and wherein, if the load level of each cell is greater than or equal to a threshold, the cell-specific control parameter value is increased in a previously determined cell-specific control parameter value and is determined to the increased cell-specific control parameter value as a cell-specific control parameter value corresponding to the detected load level of each cell.

7. The method of claim 6, wherein the determining of the cell-specific load state information comprises determining the cell-specific load state information of each cell based on at least one of wireless resource usage information, backhaul bandwidth usage information, and active user count information for each cell.

8. The method of claim 6, wherein the detecting of the cell-specific capacity information of each cell comprises:

calculating an available physical resource block (PRB) ratio and an available backhaul bandwidth ratio based on information about the cell-specific load state information of each cell of the eNB; and detecting the cell-specific capacity information of each cell using at least one of the calculated available PRB ratio and available backhaul bandwidth ratio.

9. The method of claim 6, wherein the detected cell-specific capacity information of each cell is transmitted periodically or aperiodically, and includes at least one of a cell-specific available capacity value, available capacity level information corresponding to the cell-specific available capacity value, and a bit value corresponding to the available capacity level information.

10. A system that provides a content delivery service to a user in a mobile communication system, the system comprising:

a receiver configured to receive, from an enhanced Node B (eNB), cell-specific capacity information that is determined based on cell-specific load state information of the eNB;

a controller configured to detect a load level of each cell using the received cell-specific capacity information, to determine a cell-specific control parameter value corresponding to the detected load level of each cell, and to determine a transfer rate for traffic to be transmitted to a user equipment (UE) in each cell, using the determined cell-specific control parameter value, wherein, if the detected load level of each cell is greater than or equal to a threshold, the controller is further configured to increase a previously determined cell-specific control parameter value and to determine the increased cell-specific control parameter value as a cell-specific control parameter value corresponding to the detected load level of each cell.

11. The system of claim 10, wherein the cell-specific load state information is determined based on at least one of wireless resource usage information, backhaul bandwidth usage information, and active user count information for each cell, and wherein the cell-specific capacity information is determined using at least one of an available physical resource block (PRB) ratio and an available backhaul bandwidth ratio, which are determined based on the cell-specific load state information.

12. The system of claim 10, wherein the cell-specific capacity information is received from the eNB periodically or aperiodically, and includes at least one of a cell-specific available capacity value, available capacity level information corresponding to the cell-specific available capacity value, and a bit value corresponding to the available capacity level information.

13. The system of claim 10, wherein, if the detected load level of each cell is less than the threshold, the controller is further configured to decrease the previously determined cell-specific control parameter value and to determine the decreased cell-specific control parameter value as a cell-specific control parameter value corresponding to the detected load level of each cell.

14. The system of claimer 10, wherein the controller is further configured to calculate a first value indicating a difference between a maximum value and a minimum value of a predefined traffic transfer rate, to calculate a second value by multiplying the calculated first value by the determined cell-specific control parameter value, to calculate a third value by adding the calculated second value to the minimum value, and to determine the calculated third value as the transfer rate for the traffic to be transmitted to the UE in each cell.

15. An enhanced Node B (eNB) in a mobile communication system, the eNB comprising:

a controller configured to determine a cell-specific load state information of each cell of the eNB, and to detect a cell-specific capacity information of each cell based on the determined cell-specific load state information of each cell of the eNB; and a transmitter configured to transmit information about the detected capacity of each cell to a service acceleration system that controls a traffic transfer rate, wherein the traffic transfer rate is determined by using a cell-specific control parameter value corresponding to a load level of each cell that is detected based on the cell-specific capacity information, and wherein, if the load level of each cell is greater than or equal to a threshold, the cell-specific control parameter value is increased in a previously determined cell-specific control parameter value and is determined to the increased cell-specific control parameter value as a cell-specific control parameter value corresponding to the detected load level of each cell.

16. The eNB of claim 15, wherein the controller is further configured to determine the cell-specific load state information of each cell based on at least one of wireless resource usage information, backhaul bandwidth usage information, and active user count information for each cell.

17. The eNB of claim 15, wherein the controller is further configured to calculate an available physical resource block (PRB) ratio and an available backhaul bandwidth ratio based on the cell-specific load state information of each cell of the eNB, and to detect the cell-specific capacity information of each cell using at least one of the calculated available PRB ratio and available backhaul bandwidth ratio.

18. The eNB of claim 15, wherein the detected cell-specific capacity information of each cell is transmitted periodically or aperiodically, and includes at least one of a cell-specific available capacity value, available capacity level information corresponding to the cell-specific available capacity value, and a bit value corresponding to the available capacity level information.

* * * * *